US010230535B2

(12) United States Patent
Nagarajan et al.

(10) Patent No.: US 10,230,535 B2
(45) Date of Patent: Mar. 12, 2019

(54) COMMUNICATING IGMP LEAVE REQUESTS BETWEEN LOAD-BALANCED, MULTI-HOMED PROVIDER-EDGE ROUTERS IN AN ETHERNET VIRTUAL PRIVATE NETWORK

(71) Applicant: Juniper Networks, Inc., Sunnyvale, CA (US)

(72) Inventors: Vikram Nagarajan, Chennai (IN); Robert W. Kebler, Newburyport, MA (US); Eric C. Rosen, Arlington, MA (US); Princy T. Elizabeth, Bangalore (IN); Kapil Arora, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 135 days.

(21) Appl. No.: 15/281,362

(22) Filed: Sep. 30, 2016

(65) Prior Publication Data

US 2018/0034648 A1    Feb. 1, 2018

(30) Foreign Application Priority Data

Jul. 29, 2016 (IN) .............................. 201641026020

(51) Int. Cl.
*H04L 12/28* (2006.01)
*H04L 12/18* (2006.01)
(Continued)

(52) U.S. Cl.
CPC ............ *H04L 12/18* (2013.01); *H04L 7/0079* (2013.01); *H04L 12/4641* (2013.01); *H04L 12/66* (2013.01); *H04L 45/02* (2013.01); *H04L 45/24* (2013.01); *H04L 45/54* (2013.01); *H04L 45/745* (2013.01); *H04L 49/25* (2013.01);
(Continued)

(58) Field of Classification Search
None
See application file for complete search history.

(56) References Cited

U.S. PATENT DOCUMENTS

2012/0243536 A1*  9/2012  Fernandez Gutierrez ..................
                                                 H04L 12/1886
                                                 370/390
2013/0117449 A1*  5/2013  Hares ...................... H04L 45/04
                                                 709/225

(Continued)

OTHER PUBLICATIONS

Sajassi et al., "IGMP and MLD Proxy for EVPN, draft-sajassi-bess-evpn-igmp-mld-proxy-00," Internet-Draft, BESS Working Group, Oct. 17, 2015, 13 pp.

(Continued)

*Primary Examiner* — Phirin Sam
(74) *Attorney, Agent, or Firm* — Shumaker & Sieffert, P.A.

(57) ABSTRACT

In general, the disclosure describes techniques for communicating multicast group leave requests between two or more load-balanced, multi-homed PE routers included in an Ethernet Virtual Private Network (EVPN). The techniques of the disclosure enable the two or more PE routers to synchronize IGMP state and routing information amongst one another to ensure that the one of the multi-homed PE routers elected as the designated forwarder (DF) ceases forwarding the multicast group traffic to the CE router, even if it is not the PE router that receives the IGMP leave request.

26 Claims, 6 Drawing Sheets

(51) Int. Cl.
  *H04L 7/00*       (2006.01)
  *H04L 12/46*      (2006.01)
  *H04L 12/66*      (2006.01)
  *H04L 12/741*     (2013.01)
  *H04L 12/947*     (2013.01)
  *H04L 12/751*     (2013.01)
  *H04L 12/707*     (2013.01)
  *H04L 29/06*      (2006.01)
  *H04L 29/08*      (2006.01)
  *H04L 12/721*     (2013.01)

(52) U.S. Cl.
  CPC .............. *H04L 69/14* (2013.01); *H04L 45/66* (2013.01); *H04L 69/324* (2013.01); *H04L 69/325* (2013.01)

(56) References Cited

U.S. PATENT DOCUMENTS

| | | | |
|---|---|---|---|
| 2015/0055662 | A1 | 2/2015 | Bhagavathiperumal et al. |
| 2017/0201389 | A1* | 7/2017 | Tiruveedhula ...... H04L 12/1886 |
| 2017/0279837 | A1* | 9/2017 | Dasgupta ................ H04L 45/00 |
| 2017/0279838 | A1* | 9/2017 | Dasgupta ............. G06N 99/005 |
| 2018/0034665 | A1* | 2/2018 | Nguyen .............. H04L 12/4641 |

OTHER PUBLICATIONS

Sajass et al., "IGMP and MLD Proxy for EVPN, draft-sajassi-bess-evpn-igmp-mld-proxy-01," Internet-Draft, BESS Working Group, Oct. 28, 2016, 25 pp.
Search Report from counterpart European Application No. 17183882.4, dated Jan. 5, 2018, 13 pp.
Sajassi et al., "BGP MPLS-Based Ethernet VPN," RFC 7432, Internet Engineering Task Force (IETF), Feb. 2015, 56 pp.
Deering, "Host Extensions for IP Multicasting," RFC 1112, Network Working Group, Aug. 1989, 17 pp.
Fenner, "Internet Group Management Protocol, Version 2," RFC 2236, Network Working Group, Nov. 1997, 24 pp.
Cain et al., "Internet Group Management Protocol, Version 3," RFC 3376, Network Working Group, Oct. 2002, 53 pp.
Holbrook et al, "Using Internet Group Management Protocol Version 3 (IGMPv3) and Multicast Listener Discovery Protocol Version 2 (MLDv2) for Source-Specific Multicast," RFC 4604, Network Working Group, Aug. 2006, 11 pp.
Rosen et al., "BGP/MPLS IP Virtual Private Networks (VPNs)," RFC 4364, Network Working Group, Feb. 2006, 47 pp.
Response to Search Report dated Jan. 5, 2018, from counterpart European Application No. 17183882.4, filed Jul. 27, 2018, 25 pp.
Examination Report from counterpart European Application No. 17183882.4, dated Oct. 30, 2018, 6 pp.

* cited by examiner

| |
|---|
| ROUTE DISTINGUISHER<br>502 |
| ETHERNET SEGMENT IDENTIFER<br>504 |
| EVI IDENTIFIER<br>506 |
| ETHERNET TAG ID<br>508 |
| MULTICAST SOURCE LENGTH<br>510 |
| MULTICAST SOURCE ADDRESS<br>512 |
| MULTICAST GROUP LENGTH<br>514 |
| MULTICAST GROUP ADDRESS<br>516 |
| ORIGINATOR ROUTER LENGTH<br>518 |
| ORIGINATOR ROUTER ADDRESS<br>520 |
| FLAGS<br>522 |

FIG. 5

| |
|---|
| ROUTE DISTINGUISHER<br>602 |
| ETHERNET SEGMENT IDENTIFER<br>604 |
| EVI IDENTIFIER<br>606 |
| ETHERNET TAG ID<br>608 |
| MULTICAST SOURCE LENGTH<br>610 |
| MULTICAST SOURCE ADDRESS<br>612 |
| MULTICAST GROUP LENGTH<br>614 |
| MULTICAST GROUP ADDRESS<br>616 |
| ORIGINATOR ROUTER LENGTH<br>618 |
| ORIGINATOR ROUTER ADDRESS<br>620 |
| LEAVE GROUP SYNCHRONIZATION &<br>SYNCHRONIZATION NUMBER<br>624 |
| MAXIMUM RESPONSE TIME<br>626 |
| FLAGS<br>622 |

FIG. 6

COMMUNICATING IGMP LEAVE REQUESTS BETWEEN LOAD-BALANCED, MULTI-HOMED PROVIDER-EDGE ROUTERS IN AN ETHERNET VIRTUAL PRIVATE NETWORK

This application claims the benefit of Indian Provisional Patent Application No. 201641026020, filed on Jul. 29, 2016, the entire content of which is incorporated herein by reference.

TECHNICAL FIELD

This disclosure generally relates to computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via the intermediate network. In a typical configuration, PE network devices (e.g., routers and/or switches) coupled to the CE network devices of the customer networks define label switched paths (LSPs) within the provider network to carry encapsulated L2 communications as if these customer networks were directly attached to the same local area network (LAN). In some configurations, the PE network devices may also be connected by Internet Protocol (IP) infrastructure in which case IP/Generic Routing Encapsulation (GRE) tunneling or other IP tunneling can be used between the network devices.

A data center may be connected to the intermediate EVPN by an Ethernet segment provided by one or more PE network devices. That is, the one or more PE network devices are coupled to the data center by access links that logically operate as an Ethernet segment and, therefore, provide connectivity to the EVPN for one or more customer networks within the local data center.

SUMMARY

In general, the disclosure describes techniques for communicating multicast group leave requests between two or more load-balanced, multi-homed provider edge (PE) routers included in an Ethernet Virtual Private Network (EVPN). In an EVPN where a customer edge (CE) router is multi-homed to a plurality of PE routers via an Ethernet Segment (ES), the ES appears as a link aggregation group (LAG) to the CE router. The CE router performs load balancing of traffic across the ES, including load balancing Internet Group Management Protocol (IGMP) join and leave requests for multicast groups. Due to the traffic load balancing, a PE router not designated as the designated forwarder (DF) may receive an IGMP Leave request. In this situation, the PE router updates its state and forwarding information so as to cease forwarding multicast traffic belonging to the multicast group designated by the IGMP Leave request. However, if the PE router does not inform other multi-homed PE routers about the IGMP Leave request, the other multi-homed PE routers have outdated state information.

In the above scenario, because the PE router designated as the DF did not receive the IGMP Leave request, it continues to forward multicast traffic from the designated multicast group for up to 120 seconds, a lag time referred to as "Leave Latency." During this time, the CE router continues to receive unwanted multicast traffic, which it discards. This is undesirable because network traffic may be discarded without reaching its destination, or informing the point of origin that the destination was unreachable, negatively impacting the network performance of the end-user. Furthermore, the CE router wastes valuable network resources receiving undesired traffic, determining that the traffic is undesired, and discarding the undesired traffic. The Border Gateway Protocol (BGP) does not provide a framework for a PE router to notify other multi-homed PE routers about its receipt of an IGMP Leave request.

According to the techniques of the disclosure, methods, devices, and systems are described for communicating, by the plurality of load-balanced, multi-homed PE routers, BGP leave synch route used to synchronize, amongst the plurality of PE routers, an IGMP Leave message received by a non-DF PE router on the ES. Such a BGP leave synch route allows the plurality of PE routers to synchronize IGMP state information for the multicast group to ensure that the one of the multi-homed PE routers elected as the designated forwarder (DF) ceases forwarding of the multicast group traffic to the CE router, even if it is not the PE router that receives the IGMP leave request.

In one example, the techniques of the disclosure include: a method including: receiving, by a first provider edge (PE) router of a plurality of PE routers included in an Ethernet segment of an Ethernet Virtual Private Network (EVPN) and from a first customer edge (CE) router multi-homed to the plurality of PE routers and performing load balancing on the Ethernet segment, a multicast group leave request; and in response to receiving the request to leave the multicast group: determining, by the first PE router, whether a Routing Information Base (RIB) table of the first PE router includes a Border Gateway Protocol (BGP) join synch route used to synchronize a multicast group join request designating one of the plurality of PE routers included in the Ethernet segment; and upon determining that the RIB table of the first PE router contains the BGP join synch route, issuing, by the first PE router and to other of the plurality of PE routers included in the Ethernet segment, a BGP leave synch route used to synchronize the multicast group leave request.

In another example, the techniques of the disclosure include: a method including: receiving, by a second provider edge (PE) router of a plurality of PE routers included in an Ethernet segment of an Ethernet Virtual Private Network (EVPN) and from a first PE router of the plurality of PE routers included in the Ethernet segment, a Border Gateway Protocol (BGP) leave synch route used to synchronize a multicast group leave request, wherein the plurality of PE routers is multi-homed to a first customer edge (CE) router; and in response to receiving the BGP leave synch route: starting, by the second PE router, a Last Member Query (LMQ) timer for the multicast group; and adding, by the second PE router, the BGP leave synch route to a Routing Information Base (RIB) table of the second PE router.

In another example, the techniques of the disclosure include: a first provider edge (PE) router of a plurality of PE routers included in an Ethernet segment of an Ethernet Virtual Private Network (EVPN), configured to: receive, from a first customer edge (CE) router multi-homed to the plurality of PE routers and performing load balancing on the Ethernet segment, a request to leave a multicast group; and in response to receiving the request to leave the multicast group: determine whether a Routing Information Base (RIB) table of the first PE router includes a Border Gateway Protocol (BGP) join synch route used to synchronize a multicast group join request designating one of the plurality of PE routers included in the Ethernet segment; and upon determining that the RIB table of the first PE router contains the BGP join synch route, issue, to other of the plurality of PE routers included in the Ethernet segment, a BGP leave synch route used to synchronize the multicast group leave request.

In another example, the techniques of the disclosure include: a second provider edge (PE) router of a plurality of PE routers included in an Ethernet segment of an Ethernet Virtual Private Network (EVPN), configured to: receive, from a first PE router of the plurality of PE routers included in the Ethernet segment, a Border Gateway Protocol (BGP) leave synch route used to synchronize a multicast group leave request, wherein the plurality of PE routers is multi-homed to a first customer edge (CE) router; and in response to receiving the BGP leave synch route: start a Last Member Query (LMQ) timer for the multicast group; and add the BGP leave synch route to a Routing Information Base (RIB) table of the second PE router.

In another example, the techniques of the disclosure include: a non-transitory computer-readable medium including instructions that, when executed, causes a first provider edge (PE) router of a plurality of PE routers included in an Ethernet segment of an Ethernet Virtual Private Network (EVPN) to: receive, from a first customer edge (CE) router multi-homed to the plurality of PE routers and performing load balancing on the Ethernet segment, a request to leave a multicast group; and in response to receiving the request to leave the multicast group: determine whether a Routing Information Base (RIB) table of the first PE router includes a Border Gateway Protocol (BGP) join synch route used to synchronize a multicast group join request designating one of the plurality of PE routers included in the Ethernet segment; and upon determining that the RIB table of the first PE router contains the BGP join synch route, issue, to other of the plurality of PE routers included in the Ethernet segment, a BGP leave synch route used to synchronize the multicast group leave request.

In another example, the techniques of the disclosure include: a non-transitory computer-readable medium including instructions that, when executed, causes a second provider edge (PE) router of a plurality of PE routers included in an Ethernet segment of an Ethernet Virtual Private Network (EVPN) to: receive, from a first PE router of the plurality of PE routers included in the Ethernet segment, a Border Gateway Protocol (BGP) leave synch route used to synchronize a multicast group leave request, wherein the plurality of PE routers is multi-homed to a first customer edge (CE) router; and in response to receiving the BGP leave synch route: start a Last Member Query (LMQ) timer for the multicast group; and add the BGP leave synch route to a Routing Information Base (RIB) table of the second PE router.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 5 is a block diagram illustrating an example bitmap for a BGP Join Synch Route in accordance with the techniques of the disclosure.

FIG. 6 is a block diagram illustrating an example bitmap for a BGP Leave Synch Route in accordance with the techniques of the disclosure.

DETAILED DESCRIPTION

Figure 1:
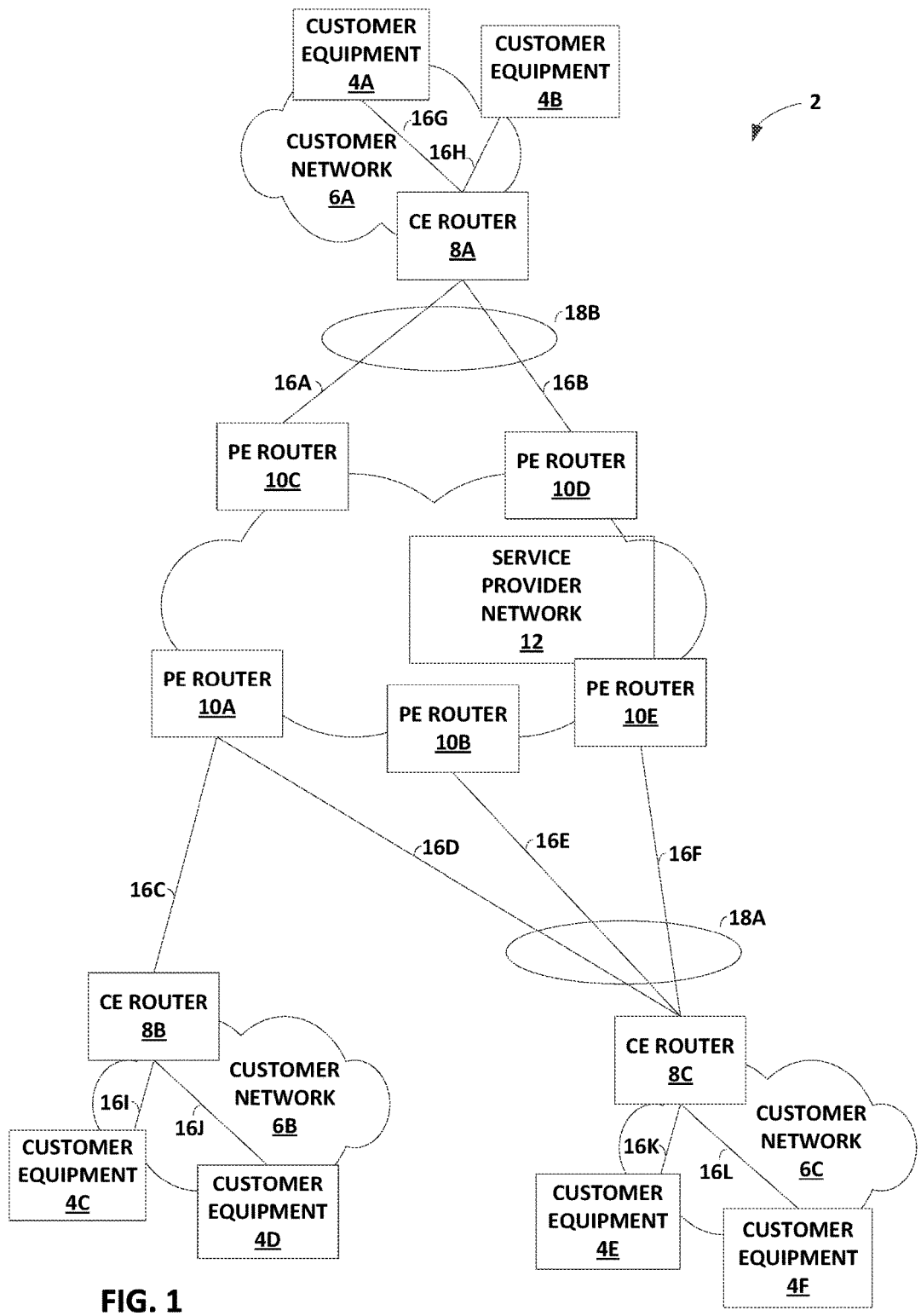
FIG. 1 is a block diagram illustrating an example EVPN in accordance with the techniques of the disclosure.

FIG. 1 is a block diagram illustrating an example EVPN in accordance with the techniques of the disclosure. In the example of FIG. 1, computer system 2 that includes a service provider network 12 configured to host an EVPN to connect disparate customer networks 6A-6C ("customer networks 6"). PE routers 10A-10E ("PE routers 10") of service provider network 12 provide customer equipment 4A-4F ("customer equipment 4") associated with customer networks 6 with access to service provider network 12 via CE routers 8A-8C ("CE routers 8"). Communication links 16A-16L may be Ethernet, ATM or any other suitable network connections.

PE routers 10 and CE routers 8 are illustrated as routers in the example of FIG. 1. However, techniques of the disclosure may be implemented using switches or other suitable network devices that participate in a layer two (L2) virtual private network service, such as an EVPN. Customer networks 6 may be networks for geographically separated sites of an enterprise. Each of customer networks 6 may include additional customer equipment 4A-4F, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely an example. For example, an enterprise may include any number of customer networks 6. Nonetheless, for ease of description, only customer networks 6A-6C are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is an L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by service provider network 12 includes EVPN service. For example, an EVPN is a service that provides a form of L2 connectivity across an intermediate L3 network, such as service provider network 12, to interconnect two L2 customer networks, such as customer networks 6, that are usually located in two different geographic areas. Often, EVPN is transparent to the customer networks in that these customer networks are not aware of the intervening intermediate service provider network and instead act and operate as if these two customer networks were directly connected and formed a single L2 network. In a way, EVPN enables a form of a transparent LAN connection between two geographically distant customer sites that each operates a L2 network and, for this reason, EVPN may also be referred to as a "transparent LAN service." Additional example information with respect to the EVPN protocol is described in "BGP MPLS-Based Ethernet VPN," RFC7432, Internet Engineering Task Force (IETF), February 2015, available at https://tools.ietf.org/html/rfc7432, the entire contents of which is incorporated herein by reference.

To configure an EVPN, a network operator of the service provider configures various devices included within service provider network 12 that interface with customer networks 6. The EVPN configuration may include an EVPN instance (EVI), which comprises one or more broadcast domains. Generally, an EVI may refer to a routing and forwarding instance on a PE router, such as PE routers 10A-10E. Consequently, multiple EVIs may be configured on PE routers 10 for an Ethernet segment (ES), as further described herein, each providing a separate, logical layer two (L2) forwarding domain. In this way, multiple EVIs may be configured that each includes one or more of PE routers of an Ethernet segment. For example, Ethernet segment 18A may comprise a first EVI which includes PE routers 10A, 10B, and 10E, and a second EVI, which includes only PE routers 10A, 10B. In some examples, Ethernet Tags are then used to identify a particular broadcast domain, e.g., a VLAN, in an EVI. A PE router may advertise a unique EVPN label per <ESI, Ethernet Tag> combination. This label assignment methodology is referred to as a per <ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment.

In order to operate in an active-active Ethernet segment, for example, Ethernet segment 18A, an EVPN protocol executing on PE routers 10A, 10B, and 10E triggers EVPN designated forwarder (DF) election for Ethernet segment 18A. This may be accomplished, for example, by EVPN protocol executing on each of PE routers 10A, 10B, and 10E that participates in Ethernet segment 18A directing the router to output a routing protocol message advertising an Ethernet Segment Identifier (ESI), which is typically unique across all EVPN instances (EVIs).

FIG. 1 illustrates an EVPN environment that includes Ethernet segments 18A and 18B. In typical operation, PE routers 10A-10E communicate using BGP. PE routers 10 may interoperate using BGP in accordance with the techniques described in "BGP MPLS-Based Ethernet VPN," RFC7432, as referenced above.

In the example of FIG. 1, when providing the EVPN service to customer networks 6, PE routers 10 and CE routers 8 typically perform MAC address learning to efficiently forward L2 network communications in system 2. That is, as PE routers 10 and CE routers 8 forward Ethernet frames, the routers learn L2 state information for the L2 network, including MAC addressing information for customer equipment 4 within the network and the physical ports through which customer equipment 4 are reachable. PE routers 10 and CE routers 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC address for customer equipment 4 reachable through local attachment circuits, the PE routers 10 utilize MAC address route advertisements of a layer three (L3) routing protocol (i.e., BGP in this example) to share the learned MAC addresses and to provide an indication that the MAC addresses are reachable through the particular PE router that is issuing the route advertisement. In the EVPN implemented using PE routers 10 for a given EVI, each of PE routers 10 advertises the locally learned MAC addresses to other PE routers 10 using a BGP route advertisement, also referred to herein as a "MAC route" or a "MAC Advertisement route." As further described below, a MAC route typically specifies an individual MAC address of customer equipment 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN. Accordingly, PE routers 10 may perform both local learning and remote learning of MAC addresses.

Network traffic from the EVPN core may be associated with a (Source, Group), i.e., (S, G), label to designate a source of the traffic and a multicast group to which the traffic belongs. PE routers of an Ethernet segment may use IGMP Join and Leave messages received from the CE network device to establish multicast group state for routing purposes.

For example, PE routers, such as Top-of-Rack (TOR) switches, of the ES may use IGMP protocol to receive group membership information from hosts or Virtual Machines (VMs). Upon receiving, from the hosts or VMs, a notification to subscribe in the membership of a particular group, one or more PE routers forwards this request to a BGP EVPN using Ethernet Multicast Source Group Route NLRI (Network Layer Reachability Information). The NLRI also tracks the IGMP protocol version of a recipient as well as any source filtering for a given group membership. In one example, all Ethernet Multicast Source Group Routes are announced using ES-Import Route Target extended communities.

Thus, the PE routers of the Ethernet segment may route multicast network traffic to the CE device based on the (S, G) label of the multicast traffic.

Additional detail of IGMP is provided within "Host Extensions for IP Multicasting", RFC 1112, Internet Engineering Task Force (IETF), August 1989, available at https://tools.ietforg/html/rfc1112; "Internet Group Messaging Protocol, Version 2," RFC2236, Internet Engineering Task Force (IETF), November, 1997, available at https://tools.ietforg/html/rfc2236; "Internet Group Management Protocol, Version 3," RFC3376, Internet Engineering Task Force (IETF), October 2002, available at https://tools.ietf.org/html/rfc3376; and "Using Internet Group Management Protocol Version 3 (IGMPv3) and Multicast Listener Discovery Protocol Version 2 (MLDv2) for Source-Specific Multicast," RFC4604, Internet Engineering Task Force (IETF), August 2006, available at https://tools.ietf.org/html/rfc4604; the entire contents of each of which is incorporated herein by reference.

Because the LAG flow hashing algorithm of a CE router is unknown, in all-active redundancy mode, the implementation of a topology of PE routers must assume that the CE router can send a given IGMP message to any one of the multi-homed PE routers, including the DF or a PE router that is a non-DF. Therefore, each of the PE routers attached to a given ES must coordinate IGMP Join and Leave Group (x, G) state, where x may be either '*' or a particular source S, for each [EVI, broadcast domain (BD)] on that ES. This allows the DF for that [ES, EVI, BD] to correctly advertise or withdraw a Selective Multicast Ethernet Tag (SMET) route for that (x, G) group in that [EVI, BD] across all ESs for which it is the DF.

PE routers within an EVPN may communicate such IGMP instructions by exchanging routing and forwarding information according to route Types set forth by BGP. Additional detail of BGP is provided by RFC7432, as referenced above. The standard set forth in RFC7432 sets forth the following types of BGP routes. These routes may only be used to produce ESIs that satisfy the uniqueness requirements set forth by RFC7432.

Type-0. A Type-0 route indicates an arbitrary 9-octet ESI value, which is managed and configured by the operator.

Type-1. When IEEE 802.1AX LACP is used between the PEs and CEs, a Type-1 route indicates an auto-generated ESI value determined from LACP that includes the CE LACP System MAC address and the CE LACP Port Key. The CE treats the multiple PEs to which the CE is multi-homed as the same switch. Thus, the Type-1 route allows the CE to aggregate links that are attached to different PEs in the same bundle.

Type-2. A Type-2 route is used in the case of indirectly connected hosts via a bridged LAN between the CEs and the PEs. The ESI Value is auto-generated and determined based on the Layer 2 bridge protocol. If the Multiple Spanning Tree Protocol (MSTP) is used in the bridged LAN, then the value of the ESI is derived by listening to Bridge PDUs (BPDUs) on the Ethernet segment. To achieve this, the PE router is not required to run MSTP. However, the PE must learn the Root Bridge MAC address and Bridge Priority of the root of the Internal Spanning Tree (IST) by listening to the BPDUs. The Type-2 route includes a Root Bridge MAC address and a Root Bridge Priority.

Type-3. A Type-3 route indicates a MAC-based ESI Value that can be auto-generated or configured by the operator. The ESI Value includes a System MAC address and a Local Discriminator value.

Type-4. A Type-4 route indicates a router-ID ESI Value that can be auto-generated or configured by the operator. The ESI Value includes a Router ID and a Local Discriminator value.

Type-5. A Type-5 route indicates an Autonomous System (AS)-based ESI Value that can be auto-generated or configured by the operator. The ESI Value includes an AS number owned by the system and a Local Discriminator value.

Additionally, several additional BGP routes are discussed herein:

Type-6. A Type-6 route indicates that a PE router supports a particular extended community. A PE router may issue a Type-6 route to advertise that the PE router supports the particular extended community. In some examples, he Type-6 route includes a Subtype that identifies the particular extended community that is supported, such as IGMP proxy or Selective Multicast. Each Subtype may be a unique identifier that the Internet Assigned Numbers Authority (IANA) assigns from the EVPN Extended Community Subtypes registry. The Type-6 route may be encoded as an 8-octet value, wherein a first field defines the BGP route type as a Type-6 BGP route and a second field defines a subtype of the Type-6 route. The remaining bits are reserved.

For example, a PE router may implement the IGMP Proxy extended community. When advertising an ES route for a particular ES, a PE router that supports IGMP proxy on the ES attaches the Type-6 route to the ES route to advertise its support for the IGMP Proxy extended community. Because all PE routers attached to a given ES must coordinate IGMP Join (x, G) state, all PE routers attached to a given ES must support IGMP proxy before the ES may activate IGMP proxy. An RFC7432 compliant PE router does not advertise a Type-6 route. Thus, the absence of a Type-6 route in an ES route advertisement indicates that the advertising PE router does not support IGMP proxy.

As another example, a PE router may implement the Selective Multicast extended community. A PE router that supports Selective Multicast on a given [EVI, BD] must attach this extended community to an Inclusive Multicast Ethernet Tag route that the PE router advertises for that [EVI, BD]. An RFC7432 compliant PE router does not advertise a Type-6 route. Thus, the absence of a Type-6 route in an ES route advertisement indicates that the advertising PE router does not support Selective Multicast.

Type-7. A Type-7 BGP route, also referred to as a BGP join synch route, is used for coordinating or synchronizing a multicast group join request amongst PE routers of an ES. In other words, an EVPN may use a Type-7 route to coordinate the IGMP Join (x, G) state for a given [EVI, BD] between each of the PE routers attached to a given ES when operating in either single- or all-active redundancy mode. The Type-7 route indicates that a PE router has received an IGMP join request to join a multicast group on the ES. When one of the PE routers receives an IGMP join report on the Ethernet segment (ES) from the CE router, it sends out a BGP Type-7 route with the ESI value. Each additional multi-homed PE router on the Ethernet Segment imports the Type-7 route and, based on the Type-7 route, syncs its IGMP state. The PE router that is the designated forwarder (DF) forwards multicast traffic from the EVPN core to the CE router, while other PE routers that are not the DF drop the traffic. Because the states of the PE routers are synchronized via the Type-7 route, if the DF goes offline, another PE router may immediately take over as the DF and continue forwarding traffic to the CE device.

Type-8. According to the techniques of the disclosure, a BGP Type-8 route, also referred to as a BGP leave synch route, is proposed for indicating that a PE router has received an IGMP leave request to leave a multicast group on the ES. The receiving PE router uses this EVPN route type to coordinate or synchronize IGMP Leave Group (x, G) state for a given [EVI, BD] between the PE routers attached to a given ES operating in either single- or all-active redundancy mode.

Each of PE routers 10 (e.g., PE router 10D) utilizes MAC routes specifying the MAC addresses learned by other PE routers to determine how to forward L2 communications to MAC addresses that belong customer equipment 4 connected to other PEs, i.e., to remote CE routers and/or customer equipment behind CE routers operatively coupled to PE routers. That is, each of PE routers 10 determine whether Ethernet frames can be sent directly to a particular one of the other PE routers 10 or whether to treat the Ethernet frames as so called "BUM" traffic (Broadcast, Unidentified Unicast or Multicast traffic) that is to be flooded within the EVPN based on the MAC addresses learning information received from the other PE routers.

As shown in FIG. 1, CE routers 8 may be multi- and/or singly-homed to one or more of PE routers 10. In EVPN, a CE router may be said to be multi-homed when it is coupled to two physically different PE routers on the same EVI when the PE routers are resident on the same physical Ethernet Segment. As one example, CE router 8C is coupled to PE routers 10A, 10B, and 10E via links 16D-16F, respectively, where 10A, 10B, and 10E are capable of providing access to EVPN for L2 customer network 6C via CE router 8C. In instances where a given customer network (such as customer network 6C) may couple to service provider network 12 via two different and, to a certain extent, redundant links, the customer network may be referred to as being "multi-homed." In this example, CE router 8C may be multi-homed to PE routers 10A, 10B, and 10E because CE router 8C is coupled to two different PE routers PE routers 10A, 10B, and 10E via separate and, to a certain extent, redundant links 16D-16F where PE routers 10A, 10B, and 10E are each capable of providing access to EVPN for L2 customer network 6C. Multi-homed networks are often employed by network operators so as to improve access to EVPN provided by service provider network 12 should a failure in one of links 16D, 16E, and 16F occur. In a typical EVPN configuration, only the multi-homing PEs 10A, 10B, and 10E participate in DF election for each ESI. CE router 8B is single-homed to PE router 10A via communication link 16C.

An EVPN may operate over a Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using a MPLS protocol, each router along an LSP allocates a label and propagates the label to the closest upstream router along the path. Routers along the path add or remote the labels and perform other MPLS operations to forward the MPLS packets along the established path.

As shown in the example of FIG. 1, PE routers 10A-10E and provider router 18 may provide an MPLS core for sending network packets from customer network 6A to and from customer network 6C. Each of PE routers 10A-10E implement the MPLS protocol and apply one or more MPLS labels, i.e., a label stack, to network packets in accordance with routing and forwarding information configured at each respective PE router. As described above, PE router 10C may attach an MPLS label advertised by PE router 10A to a packet that PE router 10C is forwarding to PE router 10A, such that the packet is forwarded through service provider network 12 to PE router 10C.

During startup, each PE router connected to the same Ethernet segment (e.g., as in a multi-homing configuration) may automatically discover other PE routers on the same segment. Each of these PE routers may elect a designated forwarder (DF) that is responsible for forwarding traffic from the core to a CE router. Furthermore, each PE router may use EVPN BGP MAC advertisement routes to distribute reachability information for the B-MACs associated with the local Ethernet segments to which it belongs.

To allow an ingress PE router supporting selective multicast to properly assign receiving PE routers to its inclusive and selective P-Tunnels, a PE supporting selective multicast indicates this capability in its advertisement of Inclusive Multicast Ethernet Tag routes using a Type-6 route, as described above.

If an ingress PE router uses ingress replication, then for a given (x, G) group in a given [EVI, BD], first, the PE router sends (x, G) traffic to the set of PE routers not supporting selective multicast. This set consists of any PE router that has advertised an Inclusive Multicast Tag route for the [EVI, BD] without advertising support for the Selective Multicast extended community, e.g., via a corresponding BGP Type-6 route as described above.

Second, the PE router sends (x, G) traffic to the set of PE routers supporting selective multicast and having listeners for that (x, G) group in that [EVI, BD]. This set consists of any PE router that has both advertised an Inclusive Multicast Tag route for the [EVI, BD], along with a BGP Type-6 route indicating support for the Selective Multicast extended community, and advertised an SMET route for that (x, G) group in that [EVI, BD].

If the inclusive P-Tunnel of an ingress PE router for a given [EVI, BD] uses Point-to-Multipoint (P2MP) communication, and if all of the PE routers in the [EVI, BD] support selective multicast, then for a given (x, G) group in a given [EVI, BD], the ingress PE router sends (x, G) traffic using the selective P-Tunnel of the ingress PE router for that (x, G) group in that [EVI, BD]. This tunnel includes the PE routers that have advertised an SMET route for that (x, G) group on that [EVI, BD], but may further include other PE routers of the ES. If the inclusive P-Tunnel of an ingress PE router for a given [EVI, BD] uses P2MP communication, and if at least one of the PE routers in the [EVI, BD] does not support selective multicast, then the ingress PE router sends (x, G) traffic using the inclusive P-Tunnel of the PE router for the [EVI, BD].

In the example of FIG. 1, PE routers 10A, 10B, and 10E belong to ES 18A, and have elected PE router 10B as the DF. If PE router 10A, for example, receives an IGMP join report on the ES from CE router 8C, it sends out a BGP Type-7 route with the Ethernet Segment Identifier (ESI) value. Each additional multi-homed PE router on the Ethernet Segment, e.g., PE routers 10B and 10E, imports the Type-7 route and, based on the Type-7 route, creates an IGMP state. PE router 10B, as the designated forwarder (DF), forwards traffic from the EVPN core 12 to the CE router 8C, while other PE routers that are not the DF, e.g., PE Routers 10A and 10E, drop the traffic. Because the states of the PE routers are synchronized via the Type-7 route, if the DF goes offline, another PE router, such as PE router 10A or 10E, may immediately take over as the DF and continue forwarding traffic to the CE router 8C.

In the situation where the CE router 8C load balances traffic to each of PE routers 10A, 10B, and 10E, a PE router not designated as the DF, such as PE router 10A, may receive an IGMP Leave request. In this situation, the PE router 10A updates its state and forwarding information so as to cease forwarding multicast traffic belonging to the multicast group designated by the IGMP Leave request.

However, if the PE router 10A does not inform other multi-homed PE routers about the IGMP Leave request, the other multi-homed PE routers have outdated state information. Specifically, because the PE router 10B, designated as the DF, did not receive the IGMP Leave request, it continues to forward multicast traffic from the designated multicast group for up to 120 seconds, a lag time referred to as "Leave Latency." During this time, the CE router 8C continues to receive unwanted multicast traffic from PE router 10B, which CE router 8C discards. This is undesirable because network traffic may be discarded without reaching its destination, or informing the point of origin that the destination was unreachable, negatively impacting the network performance of the end-user. Furthermore, the CE router 8C wastes valuable network resources receiving undesired traffic, determining that the traffic is undesired, and discarding the undesired traffic.

According to the techniques of the disclosure, an eighth BGP route type is described that notifies the one or more PE routers of an IGMP Leave message received by another PE router on the ES, and enables the one or more PE routers to update their state information to prevent the forwarding of undesired traffic to the CE router. For example, upon receiving an IGMP leave requests from the CE router 8C, PE router 10A issues a BGP Type-8 ADD communication used to indicate the IGMP Leave request to the other PE routers on the ES, e.g., PE router 10B and PE router 10E. Further, PE router 10A issues a Last Member Query (LMQ) message to the other PE routers on the Ethernet segment 18A that belong to the same multicast group (e.g., PE router 10B and PE router 10E). Furthermore, each of PE routers 10A, 10B, and 10E begins an LMQ timer.

In one example, while the LMQ timer is running, PE router 10A receives an IGMP Join message. In response to this message, PE router 10A stops the LMQ timer. If PE router 10A currently has a BGP Type-8 ADD communication in its Routing Information Base (RIB) table instructing PE router 10A to leave the multicast group, PE router 10A withdraws the instruction and remains within the multicast group. If a BGP Type-7 message referencing PE router 10A does not already exist, PE router 10A adds one to its RIB table.

In another example, while the LMQ timer is running, PE router 10A receives a BGP Type-7 ADD communication to add a peer PE router to the multicast group. If PE router 10A currently has a BGP Type-8 ADD communication in its RIB table instructing PE router 10A to remove itself from the multicast group, PE router 10A withdraws the instruction and remains within the multicast group.

In another example, while the LMQ timer is running, PE router 10E receives a BGP Type-7 Withdraw communication naming a peer PE router, e.g., PE router 10A. If PE router 10E does not have other BGP Type-7 communications in its RIB table, PE router 10E deletes its forwarding state information for PE router 10A identified in the BGP Type-7 Withdraw communication. Furthermore, if PE router 10E contains a BGP Type-8 communication in its RIB table identifying itself, then PE router 10E deletes the BGP Type-8 communication.

In another example, if, while the LMQ timer is running, PE router 10E receives a BGP Type-8 Withdraw communication, the PE router deletes the PE router identified in the BGP Type-8 Withdraw communication from its RIB table (e.g., PE router 10A).

In a further example, the LMQ timer expires before PE router 10E receives an IGMP Join request. Upon expiration of the LMQ timer, if PE router 10E possesses a Type-7 communication in its RIB table that identifies this PE router, PE router 10E withdraws the Type-7 communication. If PE router 10E possesses a Type-7 communication in its RIB table that identifies another PE router, such as PE router 10B, PE router 10E retains forwarding state information for the identified PE router. The PE router 10E deletes state information for PE routers which are not identified by Type-7 communications in the RIB table of the PE router 10e (i.e., PE router 10A).

The following scenarios below, illustrating the techniques of the disclosure, are described with reference to FIG. 1.

Scenario I: PE Router Joins and Leaves a Multicast Group

In this example, PE router 10A receives an IGMP Join from the CE router 8C. In response, PE router 10A sends a BGP Type-7 route to all multi-homed PE routers (e.g., PE routers 10B and 10E). Each of the multi-homed PE routers receive the Type-7 route and install it in their RIB.

When PE router 10E receives an IGMP Leave from the CE router 8C, it originates a Type-8 route to indicate a Leave on the access. PE router 10A and PE router 10B import the Type-8 route received from PE router 10E. When PE router 10A and PE router 10AB receive the Type-8 ADD route from PE router 10E, each will add the PE router 10E's Type-8 route in its RIB.

The PE router receiving the IGMP Leave message (e.g., PE router 10E) originates an LMQ message. Further, each of the PE routers importing the Type-8 route (e.g., PE routers 10A, 10B, and 10E) starts the LMQ timer. The value selected for the LMQ timer takes into consideration BGP route propagation delay to an extent.

Upon expiration of the timer, each PE router may either receive reports, or not receive reports. If no IGMP Join instructions are received upon expiration of the timer, a PE router that originated a Type-7 route will withdraw its Type-7 route. A PE router that originated a Type-8 route will withdraw its Type-8 route.

PE router 10A determines whether it has other peer Type-7 routes. If it has peer Type-7 routes in its RIB, the PE router 10A deletes the Type-7 route referring to itself, but retains the its forwarding state. If there are no peer Type-7 routes, PE router 10A deletes its Type-7 message and its forwarding state.

Each of PE router 10B and PE router 10E, upon receiving a Type-7 route deletion from PE router 10A, deletes its forwarding state. PE router 10E, upon receiving a Type-7 route withdrawal, deletes its Type-8 route referring to itself and issues a withdrawal. Each of PE router 10A and PE router 10B, upon receiving the Type-8 withdrawal from PE router 10E, removes the Type-8 route from its RIB. At this point, the forwarding and state information of PE routers 10A, 10B, and 10E are updated without inducing leave latency.

Scenario II: PE Router Joins, Leaves, and Joins a Multicast Group

In this example, PE router 10A receives an IGMP Join from the CE router. In response, PE router 10A sends a BGP Type-7 route to all multi-homed PE routers (e.g., PE routers 10B and 10E). Each of the multi-homed PE routers receive the Type-7 route and install it in their RIB.

When PE router 10E receives an IGMP Leave from the CE router 8C, it originates a Type-8 route to indicate a Leave on the access. PE router 10A and PE router 10B import the Type-8 route received from PE router 10E. When PE router 10A and PE router 10B receive the Type-8 ADD route from PE router 10E, each will add the PE router 10E's Type-8 route in its RIB.

The PE router receiving the IGMP Leave message (e.g., PE router 10E) originates an LMQ message. Further, each of the PE routers importing the Type-8 route (e.g., PE routers 10A, 10B, and 10E) starts the LMQ timer. The value selected for the LMQ timer takes into consideration BGP route propagation delay to an extent.

If PE router 10A receives an IGMP report while its LMQ timer is running, PE router 10A stops the LMQ timer. PE router 10A does not update its Type-7 route, as the route has already been added in its RIB. When the LMQ timer of PE router 10B expires, PE router 10B determines that it possesses a Type-7 route from PE router 10A in its RIB. Thus, PE router 10B retains its forwarding state. Similarly, when the LMQ timer of PE router 10E expires, PE router 10E determines that it also possesses a Type-7 route from PE router 10A in its RIB. Thus, PE router 10E also retains its forwarding state.

Further, after the LMQ timer of PE router 10E expires, PE router 10E determines that it possesses a self-referring Type-8 route in its RIB. PE router 10E deletes the self-referring Type-8 route and issues a Type-8 withdrawal. PE router 10A, upon receiving the Type-8 withdrawal from PE router 10E, deletes the peer Type-8 route referring to PE router 10E from its RIB. Thus, the IGMP states and routers return to their previous forwarding state, and no IGMP state churn is induced.

Scenario III: Multiple PE routers receive an IGMP Join request

If PE router 10A receives an IGMP Join instruction, it first sends out a self-referring Type-7 route. Later, if PE router 10B receives an IGMP Join instruction, PE router 10B similarly issues a self-referring Type-7 route.

In this scenario, when PE router 10E receives an IGMP Leave instruction, PE router 10E issues a Type-8 ADD route. Upon receiving the Type-8 ADD route, each of PE router 10A and PE router 10B starts an LMQ timer. Upon the expiration of the timer, if the PE router did not receive an IGMP Join, each of PE router 10A and PE router 10B withdraws its self-referring Type-7 route from its concomitant RIB table.

In another example, PE router 10B receives an IGMP Join instruction before expiration of its LMQ timer, while PE router 10A does not. PE router 10B stops its LMQ timer. PE router 10A, upon expiration of its LMQ timer, withdraw its Type-7 route. Each of PE routers 10A and 10B retain their forwarding state because PE router 10B retains a Type-7 route.

Scenario IV: A First PE Router Joins and Leaves a Multicast Group, and a Second PE Router Joins the Multicast Group In this example, PE router 10A receives an IGMP Join from the CE router. In response, PE router 10A sends a BGP Type-7 route to all multi-homed PE routers (e.g., PE routers 10B and 10E). Each of the multi-homed PE routers receive the Type-7 route and install it in their RIB.

When PE router 10E receives an IGMP Leave from the CE router, it originates a Type-8 route to indicate a Leave on the access. PE router 10A and PE router 10B import the Type-8 route received from PE router 10E. When PE router 10A and PE router 10B receive the Type-8 ADD route from PE router 10E, each will add the PE router 10E's Type-8 route in its RIB.

The PE router receiving the IGMP Leave message (e.g., PE router 10E) originates an LMQ message. Further, each of the PE routers importing the Type-8 route (e.g., PE routers 10A, 10B, and 10E) starts the LMQ timer. The value selected for the LMQ timer takes into consideration BGP route propagation delay to an extent.

In one example, PE router 10B receives an IGMP report. PE router 10B adds a self-referring Type-7 route and issues the Type-7 route to the other PE routers. Each of PE router 10B and 10E import the Type-7 route from PE router 2.

PE router 10E, upon receiving the Type-7 route from PE router 10B, updates its RIB to include the Type-7 route. Further, because PE a new IGMP Join request has occurred on the network, PE router 10E determines that its self-referring Type-8 route should be removed. Thus, PE router 10E deletes its self-referring Type-8 route and issues a withdrawal of the Type-8 route to the other PE routers.

Meanwhile, PE router 10A continues to allow its LMQ timer to run to determine whether it receives an IGMP Join request. When the LMQ timer of PE router 10A expires, PE router 10A removes its Type-7 route. PE router 10A determines whether any peer Type-7 routes exist. Because a peer Type-7 route for PE router 10B exists, PE router 10A retains its forwarding state. PE router 10B and PE router 10E delete their Type-7 routes for PE router 10A. Because each contains a peer Type-7 route for PE router 10B in their corresponding RIB, each retains its forwarding state. PE router 10B, upon the expiration of its LMQ timer, deletes its self-referring Type8 route from its RIB and issues a withdrawal of its Type-8 route. Upon receiving this withdrawal, PE router 10A and PE router 10B delete the Type-8 route for PE router 10E from their RIB tables. Thus, PE router 10B is now the originator of Type-7 routes.

The following examples may further illustrate various techniques of the disclosure:

---
Routine-A:
---

```
If (IGMP Join received on Wire) {
    If (self Type-7 route exists) {
        nothing to do.
    } else {
        Add Type-7 route and send;
        Add forwarding state;
    }
    if (self Type-8 route exists) {
        Delete self Type-8 route and send;
    }
    if (LMQ timer running) {
        stop LMQ timer;
    }
}
```

---
Routine-B:
---

```
If (Peer Type-7 route add received) {
    if (self Type-7 route or Peer Type-7 route exists) {
        nothing to do.
    } else {
        add forwarding state;
    }
    add peer Type-7 route to RIB
    if (self Type-8 route exists) {
        delete self Type-7 route and send.
    }
}
```

---
Routine-C:
---

```
If (Peer Type-8 route add received) {
    add Peer Type-8 route to RIB;
    if (self or peer Type-7 route exists) {
        if (LMQ timer running) {
            nothing to do;
        } else {
            start LMQ timer;
        }
    }
}
```

---
Routine-D:
---

```
If (IGMP Leave received on Wire) {
    if (Type-7 route does not exist in RIB) {
        return;
    }
    if (LMQ timer running) {
        nothing to do;
    } else {
        add self Type-8 route and send;
        send LMQ onto access;
        start LMQ timer;
    }
}
```

---
Routine-E:
---

```
If (Peer Type-7 route withdraw received) {
    delete Peer Type-7 route from RIB;
    if (self Type-7 route or peer Type-7 route exists) {
        nothing to do;
    } else {
        delete forwarding state;
        if (self Type-8 route exists) {
            delete self Type-8 route and send;
        }
    }
}
```

---
Routine-F:
---

-continued

```
If (Peer Type-8 route withdraw received) {
    if (peer Type-8 route in RIB) {
        delete peer Type-8 route from RIB;
    }
}
```

Thus, techniques are described for communicating, by the plurality of load-balanced, multi-homed PE routers, an eighth BGP route type for notifying the plurality of PE routers of an IGMP Leave message received by a non-DF PE router on the ES. Such an eighth BGP route allows the plurality of PE routers to synchronize IGMP state information to ensure that the one of the multi-homed PE routers elected as the designated forwarder (DF) ceases forwarding the multicast group traffic to the CE router, even if it is not the PE router that receives the IGMP leave request.

The architecture of system 2 illustrated in FIG. 1 is shown as an example. The techniques as set forth in this disclosure may be implemented in the example system 2 of FIG. 1, as well as other types of systems not described specifically herein. Nothing in this disclosure should be construed so as to limit the techniques of this disclosure to the example architecture illustrated by FIG. 1.

Figure 2:
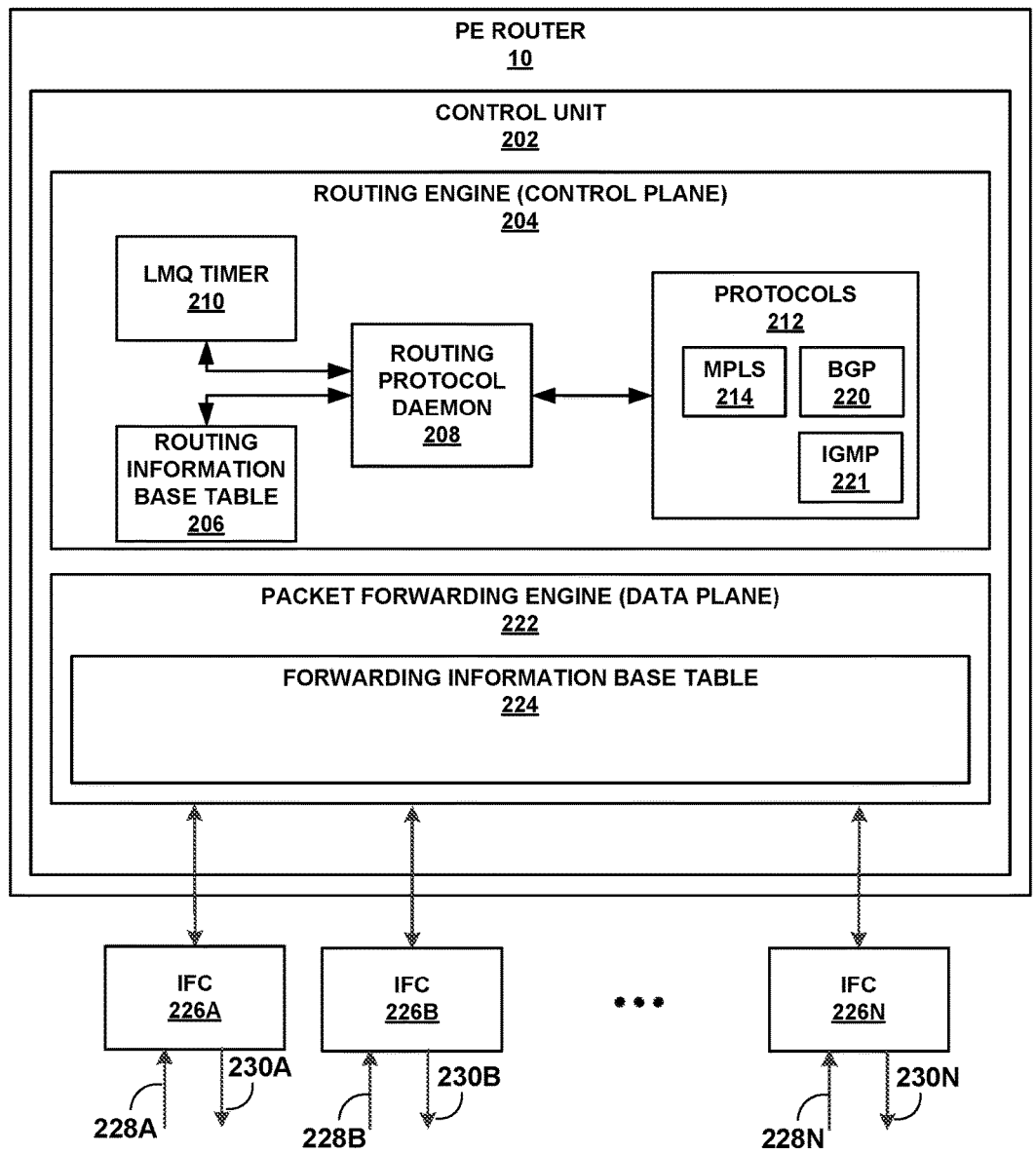
FIG. 2 is a block diagram illustrating an example provider edge router within an EVPN in accordance with the techniques of the disclosure.

FIG. 2 is a block diagram illustrating an example PE router 10 within an EVPN in accordance with the techniques of the disclosure. In general, PE router 10 may operate substantially similar to PEs 10A-E of FIG. 1. In this example, PE router 10 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. PE router 10 also includes a control unit 202 that determines routes of received packets and forwards the packets accordingly via IFCs 226.

Control unit 202 may comprise a routing engine 204 and a packet forwarding engine 222. Routing engine 204 operates as the control plane for router 200 and includes an operating system that provides a multi-tasking operating environment for execution of a number of concurrent processes. Routing engine 204, for example, executes software instructions to implement one or more control plane networking protocols 212. For example, protocols 212 may include one or more routing protocols, such as BGP 220, for exchanging routing information with other routing devices and for updating routing information base (RIB) table 206, Multiprotocol Label Switching (MPLS) protocol 214, and Internet Group Management Protocol (IGMP) 221.

In addition, routing engine 204 communicates with other routers to establish and maintain an EVPN, such as the EVPN of FIG. 1, for transporting L2 communications through an intermediate network so as to logically extend an Ethernet network through the intermediate network. When implementing an EVPN, L2 MAC learning may be performed in the control plane by exchanging, with remote PE devices, BGP messages containing MAC addresses. BGP protocol 220 communicates information recorded in forwarding information base (FIB) 224 to forwarding engine 222. Additional example information with respect to EVPN and the BGP protocol is described in MPLS-Based Ethernet VPN," RFC 7432, as referenced above, the entire contents of which are incorporated herein by reference.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

In one example, BGP 220 operates in accordance with the techniques described herein so as to advertise and/or receive Ethernet A-D per EVI routes that have been extended to carry the EVPN MH PE Status extended community data structure described herein. That is BGP protocol 220 generates for output BGP Ethernet A-D per EVI routes specifying primary PE DF and backup DF for each {ESI, EVI}. Moreover, BGP 220 may similarly be configured to receive BGP Ethernet A-D per EVI routes specifying such information, and may extract such information and convey the elections to EVPN 216.

RIB table 206 may describe a topology of the computer network in which PE router 200 resides, and may also include routes through the shared trees in the computer network. RIB table 206 describes various routes within the computer network, and the appropriate next hops for each route, i.e., the neighboring routing devices along each of the routes. Routing engine 204 analyzes information stored in RIB table 206 and generates forwarding information for forwarding engine 222, stored in FIB 224. FIB 224 may associate, for example, network destinations for certain multicast groups with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

If a PE router 10, either the DF or a non-DF PE router, receives, on a given multi-homed ES operating in all-active redundancy mode, an IGMP Membership Report for (x, G), it determines the [EVI, BD] to which the IGMP Membership Report belongs. If PE router 10 does not already have a local IGMP Join (x, G) state for that [EVI, BD] on that ES in the RIB table 206 of PE router 10, PE router 10 instantiates a local IGMP Join (x, G) state and advertises a BGP Type-7 route, e.g., a BGP leave synch route, for that [ES, EVI, BD]. In this example, (Local IGMP Join (x, G) state refers to an IGMP Join (x, G) state that is created as the result of processing an IGMP Membership Report for (x, G).)

The BGP join synch route carries the ES-Import Route Target (RT) for the ES on which the IGMP Membership Report was received. The PE router issues the BGP join synch route to all PE routers attached to that ES. Thus, all PE routers attached to the ES receive the BGP join synch route, but PE routers not attached to the ES do not receive the BGP join synch route.

If a PE router 10, either the DF or a non-DF PE router, receives a BGP join synch route, the PE router 10 installs that route in its RIB table. If PE router 10 does not already have an IGMP Join (x, G) state for that [EVI, BD] on that ES, the PE router instantiates that IGMP Join (x, G) state. In other words, the IGMP Join (X, G) state is the union of the local IGMP Join (x, G) state of PE router 10 and the installed BGP join synch routes. If the DF is not currently advertising (originating) a SMET route for that (x, G) group in that [EVI, BD], the DF does so now.

If PE router 10, either the DF or a non-DF PE router, deletes its local IGMP Join (x, G) state for that [EVI, BD] on that ES, the PE router 10 issues to the other PE routers on the ES a withdrawal of its BGP join synch route for that [ES, EVI, BD].

If PE router 10, either the DF or a non-DF PE router, receives a withdrawal of a BGP join synch route from another PE router, the receiving PE router 10 removes that BGP route. If PE router 10 has no local IGMP Join (x, G) state and it has no installed BGP join synch routes, the PE router deletes forwarding state information, such as its IGMP Join (x, G) state, for that {EVI, BD] on that ES. If the DF no longer has an IGMP Join (x, G) state for that [EVI, BD] on any ES for which it is DF, it withdraws its SMET route for that (x, G) group in that [EVI, BD]. In other words, the PE router advertises a SMET route for an (x, G) group in an [EVI, BD] only if the PE router 10 has at least one IGMP Join (x, G) state for the [EVI, BD] of the ES for which it is DF. Otherwise, if PE router 10 does not have any IGMP Join (x, G) states for the [EVI, BD] of any ES for which it is DF, PE router 10 withdraws the SMET route.

If PE router 10, either the DF or a non-DF PE router, receives, on a given multi-homed ES operating in all-active redundancy mode, an IGMP Leave Group message for (x, G) from the attached CE router, it determines the [EVI, BD] to which the IGMPv2 Leave Group belongs. Regardless of whether it has an IGMP Join (x, G) state for that [EVI, BD] on that ES, it initiates the (x, G) leave group synchronization procedure, which includes the following steps.

First, control unit 202 of PE router 10 computes the Maximum Response Time, which is the duration of the (x, G) leave group synchronization procedure. This is the product of two locally configured values, Last Member Query Count and Last Member Query Interval (described in Section 3 of RFC2236, supra), plus delta, the time it takes for a BGP route advertisement to propagate between each of the PE routers attached to the multi-homed ES. Delta is a consistently configured value on all PE routers attached to the multi-homed ES.

Second, control unit 202 of PE router 10 starts a Maximum Response Time timer. Note that the receipt of subsequent IGMP Leave Group messages or BGP leave synch routes for (x, G) do not change the value of a currently running Maximum Response Time timer.

Third, PE router 10 initiates the Last Member Query procedure described in Section 3 of RFC2236, supra; e.g., it sends a number (Last Member Query Count) of Group-Specific Query (x, G) messages at a fixed interval (Last Member Query Interval) to the attached CE router.

Fourth, PE router 10 advertises a BGP Type-8 route, e.g., a BGP leave synch route, for that that [ES, EVI, BD]. This route notifies each of the other multi-homed PE routers attached to the given multi-homed ES that the PE router has initiated an (x, G) leave group synchronization procedure. In other words, the BGP Type-8 route carries the ES-Import RT for the ES on which the IGMP Leave Group message was received. The BGP Type-8 route also contains the Maximum Response Time and the Leave Group Synchronization Procedure Sequence number. The latter identifies the specific (x, G) leave group synchronization procedure initiated by the advertising PE router, which increments the value whenever it initiates a procedure. Note that if a PE router receives a subsequent BGP leave synch route for (x, G) after the (x, G) leave group synchronization procedure is initiated, the PE router ignores it.

If PE router 10, either the DF or a non-DF PE router, receives a BGP leave synch route, PE router 10 installs the BGP route and starts a timer for (x, G) on the specified [ES, EVI, BD], wherein the value of the timer is set to the Maximum Response Time in the received BGP leave synch route. Note that the receipt of subsequent IGMPv2 Leave Group messages or BGP leave synch routes for (x, G) do not change the value of a currently running Maximum Response Time timer.

If PE router 10 is attached to the multi-homed ES and receives an IGMP Membership Report for (x, G) before the Maximum Response Time timer expires, and if PE router 10 does not already have a local IGMP Join (x, G) state for that [EVI, BD] on that ES, PE router 10 instantiates a local IGMP Join (x, G) state. Further, the PE router advertises a BGP join synch route for that [ES, EVI, BD]. If the DF is not currently advertising (originating) a SMET route for that (x, G) group in that [EVI, BD], it does so now.

If PE router 10 is attached to the multi-homed ES and receives a BGP leave synch route for (x, G) before the Maximum Response Time timer expires, the PE router installs that route in its RIB table. If the PE router does not already have an IGMP Join (x, G) state for that [EVI, BD] on that ES, the PE router instantiates that IGMP Join (x, G) state. If the DF is not currently advertising (originating) a SMET route for that (x, G) group in that [EVI, BD], the PE router does so now.

When the Maximum Response Timer expires, PE router 10 that has advertised a BGP leave synch route issues a withdrawal of the BGP leave synch route. If PE router 10 has no local IGMP Join (x, G) state and has no installed BGP join synch routes, PE router 10 removes the IGMP Join (x, G) state for that [EVI, BD] on that ES. If the DF no longer has an IGMP Join (x, G) state for that [EVI, BD] on any ES for which it is DF, the DF issues a withdrawal of its SMET route for that (x, G) group in that [EVI, BD].

To facilitate state synchronization after failover, each of the PE routers attached to a multi-homed ES operating in single-active redundancy mode also coordinate a IGMP Join (x, G) state, as described above. In this case, the DF receives all IGMP Join messages and distributes the IGMP join messages to the non-DF PEs using the procedures described above via BGP join synch routes.

According to the techniques of the disclosure, PE router 10 issues a BGP leave synch route to one or more PE routers to notify the one or more PE routers of an IGMP Leave message received by the PE router on the ES. Such a BGP route allows the PE routers of the ES to update their state information to prevent the forwarding of undesired traffic to the CE router. In one example, control unit 202 of PE router 10 receives, via incoming links 228 of IFCs 226, an IGMP leave request from the CE router 8C. In response to this request, the control unit 202 issues, via outbound links 230 of IFCs 226, a BGP Type-8 ADD communication to indicate the IGMP Leave request to the other PE routers on the ES. Further, control unit 202issues, via outbound links 230 of IFCs 226, a Last Member Query (LMQ) message to other PE routers on the ES that belong to the same multicast group. Furthermore, control unit 202begins an LMQ timer 210.

In another example, while the LMQ timer 210 is running, control unit 202 receives, via incoming links 228 of IFS 226, an IGMP Join message from CE router 8C. In response to this message, control unit 202 stops the LMQ timer 210. If FIB 224 currently has a BGP Type-8 ADD communication in its Routing Information Base (RIB) table instructing PE router 10 to leave the multicast group, control unit 202 withdraws the instruction and PE router 10 remains within the multicast group. If FIB 224 does not already possess a BGP Type-7 message referencing PE router 10, control unit 202 adds one to its RIB table.

In another example, while the LMQ timer 210 is running, control unit 202, via incoming links 228 of IFCs 226, receives a BGP Type-7 ADD communication to add a peer PE router to the multicast group. If FIB 224 currently has a BGP Type-8 ADD communication in its RIB table instructing control unit 202 to remove PE router 10 from the multicast group, control unit 202 withdraws the instruction and remains within the multicast group.

In another example, while the LMQ timer 210 is running, control unit 202 receives, via incoming links 228 of IFC 226, a BGP Type-7 Withdraw communication naming a peer PE router. If FIB 224 does not have other BGP Type-7 communications in its RIB table, control unit 202 deletes its forwarding state information for the peer PE router identified in the BGP Type-7 Withdraw communication. Furthermore, if FIB 224 contains a BGP Type-8 communication in its RIB table identifying PE router 10, then control unit 202 deletes the BGP Type-8 communication.

In another example, if, while the LMQ timer 210 is running, control unit 202 receives, via incoming links 228 of IFCs 226, a BGP Type-8 Withdraw communication from CE router 8C, the control unit 202 deletes the peer PE router identified in the BGP Type-8 Withdraw communication from its RIB table.

In a further example, the LMQ timer 210 expires before control unit 202 receives an IGMP Join request. Upon expiration of the LMQ timer 210, if FIB 224 possesses a Type-7 communication in its RIB table that identifies this PE router 10, control unit 202 withdraws the Type-7 communication. If FIB 224 possesses a Type-7 communication in its RIB table that identifies a peer PE router, control unit 202 retains forwarding state information for the identified peer PE router. The control unit 202 deletes state information for PE routers which are not identified by Type-7 communications in the RIB table of FIB 224.

Thus, techniques are described for communicating, by the plurality of load-balanced, multi-homed PE routers, an eighth BGP route type for notifying the plurality of PE routers of an IGMP Leave message received by a non-DF PE router on the ES. Such an eighth BGP route allows the plurality of PE routers to synchronize IGMP state information to ensure that the one of the multi-homed PE routers elected as the designated forwarder (DF) ceases forwarding the multicast group traffic to the CE router, even if it is not the PE router that receives the IGMP leave request.

The architecture of PE router 10 illustrated in FIG. 2 is shown as an example. The techniques as set forth in this disclosure may be implemented in the example PE router 10 of FIG. 2, as well as other types of systems not described specifically herein. Nothing in this disclosure should be construed so as to limit the techniques of this disclosure to the example architecture illustrated by FIG. 2.

Figure 3:
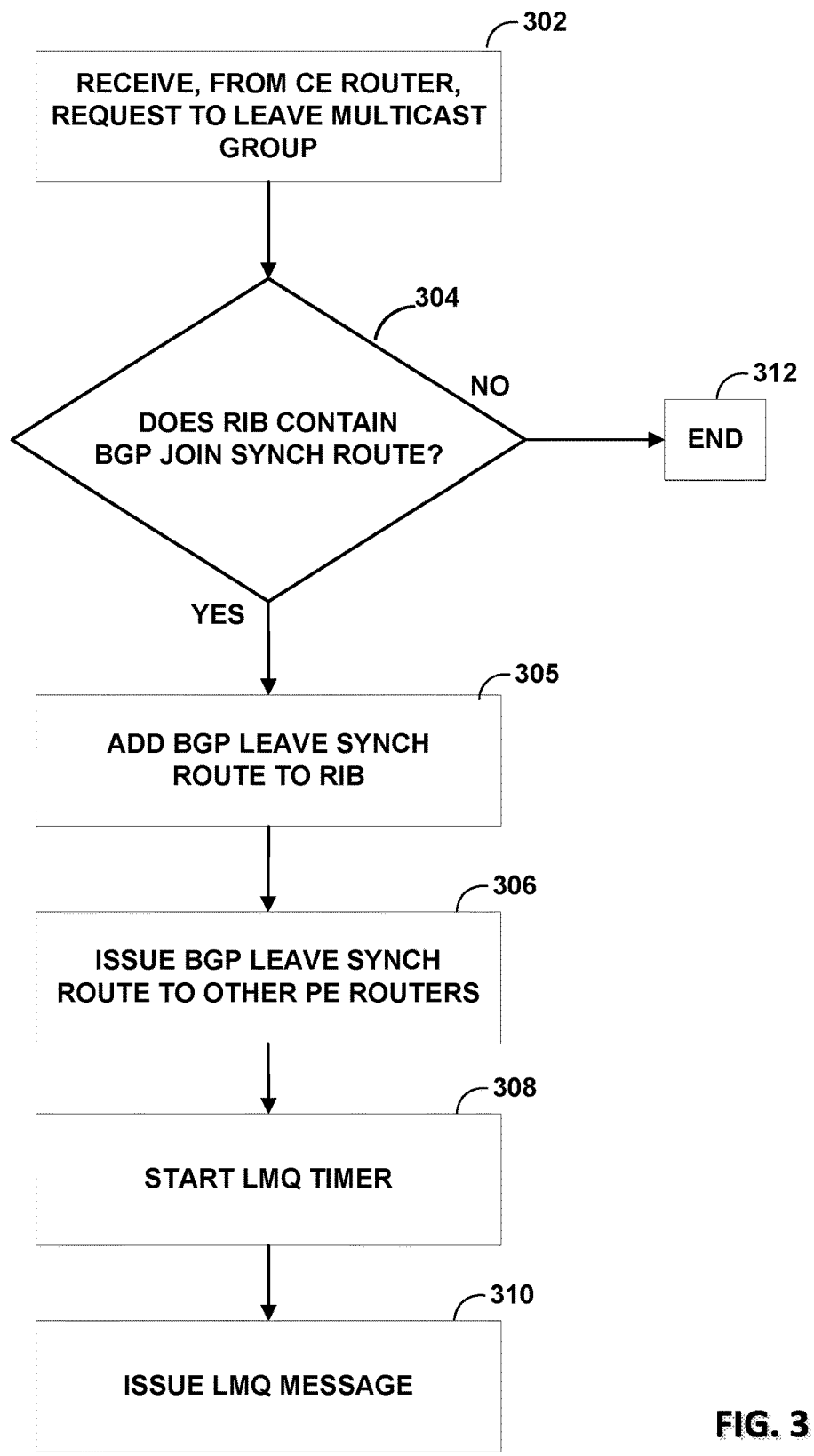
FIG. 3 is a flowchart illustrating an example operation for issuing a BGP leave synch route for coordinating a multicast group leave request amongst PE routers of an Ethernet segment in accordance with the techniques of the disclosure.

FIG. 3 is a flowchart illustrating an example operation for issuing a BGP leave synch route for coordinating a multicast group leave request amongst PE routers of an Ethernet segment in accordance with the techniques of the disclosure. For convenience, FIG. 3 is described with respect to FIG. 1. In some examples, multicast group join requests and multicast group leave requests are IGMP group join and group leave requests.

In the example of FIG. 3, PE router 10A receives a request to leave a multicast group from CE router 8C (302). In response to receiving the request to leave the multicast group, PE router 10A determines whether a RIB table of PE router 10A contains a BGP join synch route, such as a BGP Type-7 route as described above, that designates one of the PE routers in the Ethernet segment (i.e., one of PE router 10A, 10B, and 10E) (304). Upon determining that the RIB table of PE router 10A contains the BGP join synch route (YES branch of 304), PE router 10A issues to PE routers 10B and 10E a BGP leave synch route, such as a BGP Type-8 route as described above (306). Further, PE router 10A adds a BGP leave synch route designating PE router 10A to the RIB table of PE router 10A (305). Additionally, PE router 10A starts an LMQ timer (308) and issues an LMQ message to each of the PE routers on the ES (i.e., PE routers 10B and 10E) (310). Upon determining that the RIB table of PE router 10A does not contains a BGP join synch route (NO branch of 304), PE router 10A takes no further action and ends the algorithm (312).

In some examples, upon expiration of the LMQ timer, PE router 10A deletes the BGP leave synch route designating PE router 10A from the RIB table of PE router 10A. Further, PE router 10A issues a withdrawal of the BGP leave synch route designating PE router 10A to the other PE routers of the ES (i.e., PE routers 10B and 10E).

Further, upon determining that the RIB table of PE router 10A contains a BGP join synch route designating the first PE router, PE router 10A deletes the BGP join synch route. Upon determining that the RIB table of PE router 10A does not contain any BGP join synch routes designating other PE routers of the ES (e.g., designating one of PE routers 10B or 10E), PE router 10A deletes its forwarding state.

Figure 4:
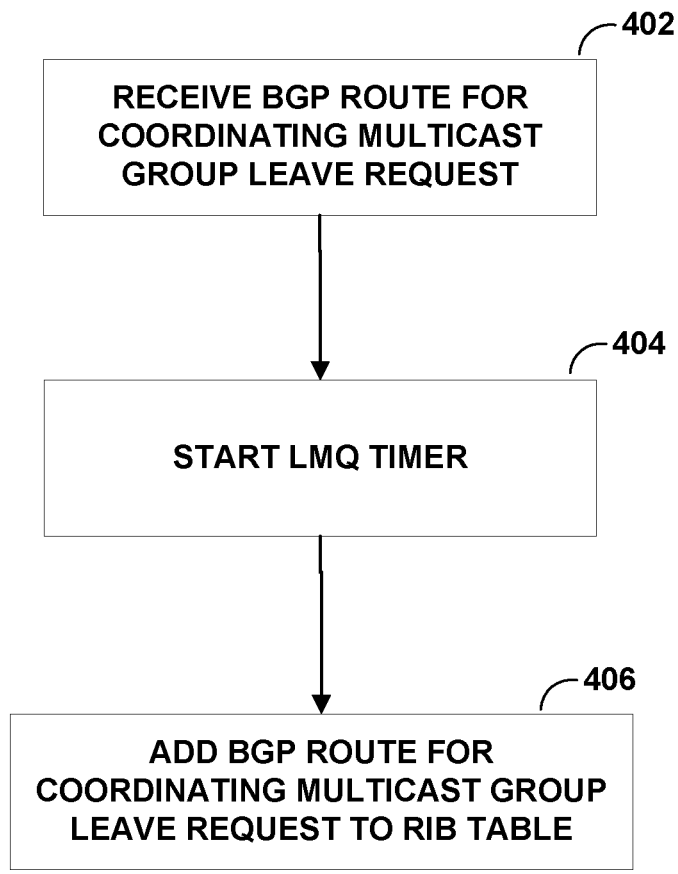
FIG. 4 is a flowchart illustrating an example operation for receiving a BGP leave synch route for coordinating the multicast group leave request amongst PE routers of an Ethernet segment in accordance with the techniques of the disclosure.

FIG. 4 is a flowchart illustrating an example operation for receiving a BGP leave synch route for coordinating the multicast group leave request amongst PE routers of an Ethernet segment in accordance with the techniques of the disclosure. FIG. 4 is described with respect to FIG. 1. In some examples, multicast group join requests and multicast group leave requests are IGMP group join and group leave requests.

In the example of FIG. 4, PE router 10B receives, from PE router 10A, a BGP leave synch route, such as a BGP Type-8 route as described above (402). In response to receiving the BGP leave synch route, PE router 10B starts an LMQ timer for the multicast group (404). PE router 10B adds the BGP leave synch route designating PE router 10A to the RIB table of PE router 10B (406). In some examples, PE router 10B adds a BGP leave synch route designating other PE routers of the ES, such as PE router 10E.

In some examples, PE router 10B receives, from CE router 8C, a request to join the multicast group. In response to receiving the join request, PE router 10B stops the LMQ timer for the multicast group. Upon determining that the RIB table of PE router 10B has a BGP leave synch route, PE router 10 issues a withdrawal of the BGP leave synch route to the other PE routers of the ES (i.e., PE routers 10A and 10E). Upon determining that the RIB table of PE router 10B does not have a BGP join synch route designating PE router 10B, PE router 10B adds such a BGP join synch route designating PE router 10B to the RIB table of PE router 10B.

In some examples, PE router 10B receives, from PE router 10A, a BGP join synch route designating PE router 10A. In response to the BGP route, PE router 10B adds the BGP join synch route designating PE Router 10A to the RIB table of PE router 10B. Upon determining that the RIB table of PE router 10B has a BGP leave synch route, PE router 10 deletes the BGP leave synch route from the RIB table of PE router 10B and issues a withdrawal of the BGP leave synch route to the other PE routers of the ES (i.e., PE routers 10A and 10E).

In some examples, PE router 10B receives from PE router 10A a withdrawal of a BGP join synch route designating PE router 10A. In response to the BGP route, PE router 10B deletes the BGP join synch route designating PE router 10A from the RIB table of PE router 10B. Upon determining that the RIB table of PE router 10B does not have at least one BGP join synch route designating a PE router of the Ethernet segment (e.g., for PE router 10A or 10E), PE router 10B deletes its forwarding state. Upon determining that the RIB table of PE router 10B has a BGP leave synch route, PE router 10B deletes the BGP leave synch route from the RIB table of the second PE router.

In some examples, PE router 10B receives, from PE router 10A, a withdrawal of the BGP leave synch route. In response to the withdrawal, PE router 10B deletes the BGP leave synch route from the RIB table of PE router 10B.

In some examples, the LMQ timer of PE router 10B expires prior to receiving any additional BGP routes. Upon determining that the RIB table of PE router 10B has a BGP join synch route designating PE router 10B, PE router 10B deletes the BGP route designating PE router 10B and issues a withdrawal of the BGP route to the other PE routers of the ES (e.g., PE router 10A and 10E). Upon determining that the RIB table of PE router 10B has a BGP join synch route designating PE router 10A, PE router 10B retains its forwarding state. Otherwise, if PE router 10B determines that it does not have at least one BGP join synch route designating another PE router of the Ethernet segment (e.g., for PE router 10A or 10E), PE router 10B deletes its forwarding state.

FIG. 5 is a block diagram illustrating an example bitmap for a BGP Join Synch Route in accordance with the techniques of the disclosure. In the example of FIG. 5, the BGP Join Synch Route comprises an 8-octet Route Distinguisher (RD) field 502, a 10-octet an ESI field 504, a 4-octet EVI Identifier field 506, a 4-octet Ethernet Tag ID field 508, a 1-octet Multicast Source Length field 510, a variable-length Multicast Source Address field 512, a 1-octet Multicast Group Length field 514, a variable-length Multicast Group Address field 516, a 1-octet Originator Router Length field 518, a variable-length Originator Router Address field 520, and a 1-octet Flags field 522.

Typically, a PE router advertises a BGP Join Synch Route with an ES-Import Route Target extended community whose value is set to the ESI for the ES on which the IGMP Join was received. The Route Distinguisher (RD) 502 field is generally a Type-1 RD, per "BGP/MPLS IP Virtual Private Networks (VPNs)," RFC4364, Internet Engineering Task Force (IETF), February 2006, available at https://tools.ietf.org/html/rfc4364, the entire content of which is incorporated herein by reference.

The value of RD field 502 comprises an IP address of the PE router, which is typically the loopback address and a number unique to the PE router. The PE router sets the Ethernet Segment Identifier (ESI) field 504 to the 10-octet value defined for the ES. The PE router sets the EVI identifier field 506 as either the customer VID or a configured tag representing the EVI on the ES. If a configured tag is used, it has the same characteristics as a customer VID; i.e., it has the same value on all PE routers attached to the ES, and the value is unique across all EVIs configured on the ES. The PE router sets the Ethernet Tag ID field 508 as follows: if the EVI is VLAN-Based or VLAN Bundle service, the Ethernet Tag ID field 508 is set to 0; if the EVI is a VLAN-Aware Bundle service without translation, the Ethernet Tag ID field 508 is set to the customer VID for the [EVI, BD]; and if the EVI is a VLAN-Aware Bundle service with translation, the Ethernet ID tag field 508 is set to the normalized Ethernet Tag ID for the [EVI, BD]. The PE router sets the Multicast Source Length field 510 to the length of the multicast source address in bits. In case of a (*, G) Join, The PE router sets the Multicast Source Length field 510 to 0. The Multicast Source Address field 512 is the Source IP address of the IGMP membership report. In case of a (*, G) Join, this field does not exist. The PE router sets the Multicast Group Length field 514 to the length of the multicast group address in bits. The Multicast Group Address field 516 is the Group address of the IGMP membership report. The Originator Router Length field 518 is the length of the Originator Router address in bits. The Originator Router Address field 520 is the IP address of Router Originating the prefix. The Flags field 522 indicates the version of IGMP protocol from which the membership report was received. It also indicates whether the multicast group had INCLUDE or EXCLUDE bit set.

For the purpose of BGP route key processing, each of the fields described above are considered to be part of the prefix in the NLRI except for the one-octet Flags field 522. With regards to the Flags field 522, the least significant bit, bit 7, indicates support for IGMP version 1. The second least significant bit, bit 6, indicates support for IGMP version 2. The third least significant bit, bit 5, indicates support for IGMP version 3. The fourth least significant bit, bit 4, indicates whether the (S, G) information carried within the route-type is of the Include Group type (bit value 0) or an Exclude Group type (bit value 1). The Exclude Group type bit is ignored if bit 5 is not set. The Flags field 522 assists in distributing the IGMP membership interest of a given host or VM for a given multicast route. The version bits help associate the IGMP version of receivers participating within the EVPN domain. The include/exclude bit help in creating filters for a given multicast route.

FIG. 6 is a block diagram illustrating an example bitmap for a BGP Leave Synch Route in accordance with the techniques of the disclosure. In the example of FIG. 6, the BGP Leave Synch Route comprises an 8-octet Route Distinguisher (RD) field 602; a 10-octet Ethernet Segment Identifier field 604; a 4-octet EVI Identifier field 606; a 4-octet Ethernet Tag ID field 608; a 1-octet Multicast Source Length field 610; a variable-length Multicast Source Address field 612; a 1-octet Multicast Group Length field 614; a variable-length Multicast Group Address field 616; a 1-octet Originator Router Length field 618; a variable-length Originator Router Address field 620; a 4-octet Leave Group Synchronization & Synchronization Number field 624; a 1-octet Maximum Response Time field 626; and a 1-octet Flags field 622.

Generally, the PE router advertises the BGP Leave Synch Route with an ES-Import Route Target extended community having a value set to the ESI for the ES on which the IGMP Join was received. Typically, the PE router sets the RD field 602 as a Type-1 RD per RFC4364, as described above. The value for the RD field 602 comprises an IP address of the PE router, typically, the loopback address, followed by a number unique to the PE router. The PE router sets the Ethernet Segment Identifier (ESI) field 604 as the 10-octet value defined for the ES. The PE router sets the EVI identifier field 606 to either the customer VID or the configured tag representing the EVI on the ES. If the PE router uses a configured tag, the configured tag should have the same characteristics as a customer VID, i.e., the same value on all PE routers attached to the ES and that value must be unique across all EVIs configured on the ES. The PE router sets the Ethernet Tag ID field 608 as follows: if the EVI is a VLAN-Based or VLAN Bundle service, the PE router sets the Ethernet Tag ID field 608 to 0; if the EVI is a VLAN-Aware Bundle service without translation, the PE router sets the Ethernet Tag ID field 608 to the customer VID for the [EVI, BD]; and if the EVI is a VLAN-Aware Bundle service with translation, the PE router sets the Ethernet Tag ID field 608 to the normalized Ethernet Tag ID for the [EVI, BD]. The PE router sets the Multicast Source Length field 610 to length of the multicast source address in bits. In case of a (*, G) Join, the PE router sets the Multicast Source Length field 610 to 0. The Multicast Source Address field 612 is the Source IP address of the IGMP membership report. In case of a (*, G) Join, this field does not exist. The PE router sets the Multicast Group Length field 614 to the length of multicast group address in bits. The Multicast Group Address field 616 is the group address of the IGMP membership report. The Originator Router Length field 618 is the length of the Originator Router address in bits. The Originator Router Address field 620 is the IP address of Router Originating the prefix. The Flags field 622 indicates the version of IGMP protocol from which the membership report was received. It also indicates whether the multicast group has the INCLUDE or EXCLUDE bit set.

For the purpose of BGP route key processing, each of the fields described above are considered to be part of the prefix in the NLRI except for the Maximum Response Time field 626 and the one-octet Flags field 622. With regards to the Flags field 622, the least significant bit, bit 7, indicates support for IGMP version 1. The second least significant bit, bit 6, indicates support for IGMP version 2. The third least significant bit, bit 5, indicates support for IGMP version 3. The fourth least significant bit, bit 4, indicates whether the (S, G) information carried within the route-type is of the Include Group type (bit value 0) or an Exclude Group type (bit value 1). The Exclude Group type bit is ignored if bit 5 is not set. The Flags field 622 assists in distributing the IGMP membership interest of a given host or VM for a given multicast route. The version bits help associate the IGMP version of receivers participating within the EVPN domain. The include/exclude bit help in creating filters for a given multicast route.

The Leave Group Synchronization & Synchronization Number field 624 and the Maximum Response Time field 626 are used to ensure that a PE router receiving a Type-8 BGP Leave Sync route receives the most recent information regarding the IGMP Leave messages. If a PE router receives a first Type-8 BGP Leave Sync route with a synchronization number of X (where X indicates any integer), and later, the PE router receives a second, identical Type-8 BGP Leave Sync route with a sync number of X+1, the PE router discards the first Type-8 BGP Leave Sync route and process the second Type-8 BGP Leave Sync route to ensure consistency.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   receiving, by a first provider edge (PE) router of a plurality of PE routers included in an Ethernet segment of an Ethernet Virtual Private Network (EVPN) and from a first customer edge (CE) router multi-homed to the plurality of PE routers and performing load balancing on the Ethernet segment, a request to leave a multicast group; and
   in response to receiving the request to leave the multicast group:
      determining, by the first PE router, whether a Routing Information Base (RIB) table of the first PE router includes a Border Gateway Protocol (BGP) join synch route used to synchronize a request to join the multicast group designating one of the plurality of PE routers included in the Ethernet segment; and
      upon determining that the RIB table of the first PE router contains the BGP join synch route, issuing, by the first PE router and to other of the plurality of PE routers included in the Ethernet segment, a BGP leave synch route used to synchronize the request to leave the multicast group.

2. The method of claim 1, further comprising adding, by the first PE router, a BGP leave synch route designating the first PE router to the RIB table of the first PE router.

3. The method of claim 1, further comprising, in response to receiving the request to leave the multicast group:
   starting, by the first PE router, a Last Member Query (LMQ) timer; and
   issuing, by the first PE router, an LMQ message to the other of the plurality of PE routers included in the Ethernet segment.

4. The method of claim 3, further comprising:
   upon expiration of the LMQ timer:
      deleting, by the first PE router, a BGP leave synch route designating the first PE router from the RIB table of the first PE router;
      issuing, by the first PE router and to the other of the PE routers included in the Ethernet segment, a withdrawal of the BGP leave synch route;
      upon determining that the RIB table of the first PE router contains a BGP join synch designating the first PE router, deleting, by the first PE router, the BGP join synch route designating the first PE router from the RIB table of the first PE router; and
      upon determining that the RIB table of the first PE router does not contain a BGP join synch route designating other of the plurality of PE routers, deleting, by the first PE router, a forwarding state for the multicast group from the RIB table of the first PE router.

5. The method of claim 1, wherein the request to leave the multicast group is an Internet Group Management Protocol (IGMP) leave request.

6. A method comprising:
   receiving, by a second provider edge (PE) router of a plurality of PE routers included in an Ethernet segment of an Ethernet Virtual Private Network (EVPN) and from a first PE router of the plurality of PE routers included in the Ethernet segment, a Border Gateway Protocol (BGP) leave synch route used to synchronize a request to leave a multicast group, wherein the plurality of PE routers is multi-homed to a first customer edge (CE) router; and
   in response to receiving the BGP leave synch route:
      starting, by the second PE router, a Last Member Query (LMQ) timer for the multicast group; and
      adding, by the second PE router, the BGP leave synch route to a Routing Information Base (RIB) table of the second PE router.

7. The method of claim 6, wherein starting the LMQ timer for the multicast group comprises starting the LMQ timer for the multicast group upon determining that the RIB table of the second PE router contains a BGP join synch route.

8. The method of claim 6, further comprising:
   receiving, by the second PE router and from the first CE router multi-homed to the plurality of PE routers and performing load balancing on the Ethernet segment, a request to join the multicast group;
   in response to the request to join the multicast group, stopping, by the second PE router, the LMQ timer for the multicast group;
   upon determining that the RIB table of the second PE router has a BGP leave synch route, issuing, by the second PE router and to other of the PE routers included in the Ethernet segment, a withdrawal of the BGP leave synch route; and
   upon determining that the RIB table of the second PE router does not have a BGP join synch route designating the second PE router, adding, by the second PE router, the BGP join synch route designating the second PE router to the RIB table.

9. The method of claim 6, further comprising:
   receiving, by the second PE router and from the first PE router of the plurality of PE routers included in the Ethernet segment, a BGP join synch route designating the first PE router;
   adding, by the second PE router, the BGP join synch route designating the first PE router to the RIB table of the second PE router; and
   upon determining that the RIB table of the second PE router has a BGP leave synch route:
      deleting, by the second PE router, the BGP leave synch route; and issuing, by the second PE router and to other of the PE routers included in the Ethernet segment, a withdrawal of the BGP leave synch route.

10. The method of claim 6, further comprising:
receiving, by the second PE router and from the first PE router, a withdrawal of a BGP join synch route designating the first PE router;
deleting, by the second PE router, the BGP join synch route designating the first PE router from the RIB table of the second PE router;
upon determining that the RIB table of the second PE router does not have at least one BGP join synch route designating a PE router of the plurality of PE routers included in the Ethernet segment, deleting, by the second PE router, a forwarding state for the second PE router from the RIB table of the second PE router; and
upon determining that the RIB table of the second PE router has a BGP leave synch route, deleting, by the second PE router, the BGP leave synch route from the RIB table of the second PE router.

11. The method of claim 6, further comprising:
receiving, by the second PE router and from the first PE router, a withdrawal of the BGP leave synch route; and
deleting, by the second PE router, the BGP leave synch route from the RIB table of the second PE router.

12. The method of claim 6, further comprising, upon expiration of the LMQ timer:
upon determining that the RIB table of the second PE router has a first BGP join synch route designating the second PE router:
deleting, by the second PE router, the first BGP join synch route; and
issuing, by the second PE router and to other of the plurality of PE routers included in the Ethernet segment, a withdrawal of the first BGP join synch route;
upon determining that the RIB table of the second PE router has a second BGP join synch route designating the first PE router, retaining, by the second PE router, a forwarding state for the second PE router in the RIB table of the second PE router; and
upon determining that the RIB table of the second PE router does not have at least one BGP join synch route designating a PE router of the plurality of PE routers included in the Ethernet segment, deleting, by the second PE router, a forwarding state for the multicast group from the RIB table of the second PE router.

13. A first provider edge (PE) router of a plurality of PE routers included in an Ethernet segment of an Ethernet Virtual Private Network (EVPN), configured to:
receive, from a first customer edge (CE) router multi-homed to the plurality of PE routers and performing load balancing on the Ethernet segment, a request to leave a multicast group; and
in response to receiving the request to leave the multicast group:
determine whether a Routing Information Base (RIB) table of the first PE router includes a Border Gateway Protocol (BGP) join synch route used to synchronize a request to join a multicast group designating one of the plurality of PE routers included in the Ethernet segment; and
upon determining that the RIB table of the first PE router contains the BGP join synch route, issue, to other of the plurality of PE routers included in the Ethernet segment, a BGP leave synch route used to synchronize the request to leave the multicast group.

14. The first PE router of claim 13, wherein the first PE router is further configured to add a BGP leave synch route designating the first PE router to the RIB table of the first PE router.

15. The first PE router of claim 13, wherein the first PE router is further configured to, in response to receiving the request to leave the multicast group:
start a Last Member Query (LMQ) timer; and
issue an LMQ message to the other of the plurality of PE routers included in the Ethernet segment.

16. The method of claim 15, wherein the first PE router is further configured to:
upon expiration of the LMQ timer:
delete a BGP leave synch route designating the first PE router from the RIB table of the first PE router;
issue, to the other of the PE routers included in the Ethernet segment, a withdrawal of the BGP leave synch route;
upon determining that the RIB table of the first PE router contains a BGP join synch designating the first PE router, delete the BGP join synch route designating the first PE router from the RIB table of the first PE router; and
upon determining that the RIB table of the first PE router does not contain a BGP join synch route designating other of the plurality of PE routers, delete a forwarding state for the multicast group from the RIB table of the first PE router.

17. The method of claim 13, wherein the request to leave the multicast group is an Internet Group Management Protocol (IGMP) leave request.

18. A second provider edge (PE) router of a plurality of PE routers included in an Ethernet segment of an Ethernet Virtual Private Network (EVPN), configured to:
receive, from a first PE router of the plurality of PE routers included in the Ethernet segment, a Border Gateway Protocol (BGP) leave synch route used to synchronize a request to leave a multicast group, wherein the plurality of PE routers is multi-homed to a first customer edge (CE) router; and
in response to receiving the BGP leave synch route:
start a Last Member Query (LMQ) timer for the multicast group; and
add the BGP leave synch route to a Routing Information Base (RIB) table of the second PE router.

19. The second PE router of claim 18, wherein the second PE router configured to start the LMQ timer for the multicast group is further configured to start the LMQ timer for the multicast group upon determining that the RIB table of the second PE router contains a BGP join synch route.

20. The second PE router of claim 18, wherein the second PE router is configured to:
receive, from the first CE router multi-homed to the plurality of PE routers and performing load balancing on the Ethernet segment, a request to join the multicast group;
in response to the request to join the multicast group, stop the LMQ timer for the multicast group;
upon determining that the RIB table of the second PE router has a BGP leave synch route, issue, to other of the PE routers included in the Ethernet segment, a withdrawal of the BGP leave synch route; and
upon determining that the RIB table of the second PE router does not have a BGP join synch route designating the second PE router, add the BGP join synch route designating the second PE router to the RIB table.

21. The second PE router of claim 18, wherein the second PE router is configured to:
receive, from the first PE router of the plurality of PE routers included in the Ethernet segment, a BGP join synch route designating the first PE router;
add the BGP join synch route designating the first PE router to the RIB table of the second PE router; and
upon determining that the RIB table of the second PE router has a BGP leave synch route:
delete the BGP leave synch route; and
issue, to other of the PE routers included in the Ethernet segment, a withdrawal of the BGP leave synch route.

22. The second PE router of claim 18, wherein the second PE router is configured to:
receive, from the first PE router, a withdrawal of a BGP join synch route designating the first PE router;
delete the BGP join synch route designating the first PE router from the RIB table of the second PE router;
upon determining that the RIB table of the second PE router does not have at least one BGP join synch route designating a PE router of the plurality of PE routers included in the Ethernet segment, delete a forwarding state for the second PE router from the RIB table of the second PE router; and
upon determining that the RIB table of the second PE router has a BGP leave synch route, delete the BGP leave synch route from the RIB table of the second PE router.

23. The second PE router of claim 18, wherein the second PE router is configured to:
receive, from the first PE router, a withdrawal of the BGP leave synch route; and
delete the BGP leave synch route from the RIB table of the second PE router.

24. The second PE router of claim 18, wherein the second PE router is configured to:
upon expiration of the LMQ timer:
upon determining that the RIB table of the second PE router has a first BGP join synch route designating the second PE router:
delete the first BGP join synch route; and
issue, to other of the plurality of PE routers included in the Ethernet segment, a withdrawal of the first BGP join synch route;
upon determining that the RIB table of the second PE router has a second BGP join synch route designating the first PE router, retain a forwarding state for the second PE router in the RIB table of the second PE router; and
upon determining that the RIB table of the second PE router does not have at least one BGP join synch route designating a PE router of the plurality of PE routers included in the Ethernet segment, delete a forwarding state for the multicast group from the RIB table of the second PE router.

25. A non-transitory computer-readable medium comprising instructions that, when executed, causes a first provider edge (PE) router of a plurality of PE routers included in an Ethernet segment of an Ethernet Virtual Private Network (EVPN) to:
receive, from a first customer edge (CE) router multi-homed to the plurality of PE routers and performing load balancing on the Ethernet segment, a request to leave a multicast group; and
in response to receiving the request to leave the multicast group:
determine whether a Routing Information Base (RIB) table of the first PE router includes a Border Gateway Protocol (BGP) join synch route used to synchronize a request to join a multicast group designating one of the plurality of PE routers included in the Ethernet segment; and
upon determining that the RIB table of the first PE router contains the BGP join synch route, issue, to other of the plurality of PE routers included in the Ethernet segment, a BGP leave synch route used to synchronize the request to leave the multicast group.

26. A non-transitory computer-readable medium comprising instructions that, when executed, causes a second provider edge (PE) router of a plurality of PE routers included in an Ethernet segment of an Ethernet Virtual Private Network (EVPN) to:
receive, from a first PE router of the plurality of PE routers included in the Ethernet segment, a Border Gateway Protocol (BGP) leave synch route used to synchronize a request to leave a multicast group, wherein the plurality of PE routers is multi-homed to a first customer edge (CE) router; and
in response to receiving the BGP leave synch route:
start a Last Member Query (LMQ) timer for the multicast group; and
add the BGP leave synch route to a Routing Information Base (RIB) table of the second PE router.

* * * * *